United States Patent
Khersonsky et al.

(10) Patent No.: US 6,556,461 B1
(45) Date of Patent: Apr. 29, 2003

(54) STEP SWITCHED PWM SINE GENERATOR

(75) Inventors: Yuri Khersonsky, Yorba Linda, CA (US); Robert H. Lee, Los Altos, CA (US)

(73) Assignee: Power Paragon, Inc., Anaheim, CA (US)

( * ) Notice: Subject to any disclaimer, the term of this patent is extended or adjusted under 35 U.S.C. 154(b) by 0 days.

(21) Appl. No.: 09/992,047

(22) Filed: Nov. 19, 2001

(51) Int. Cl.$^7$ .............................. H02M 1/12; H02M 7/00
(52) U.S. Cl. ............................................ 363/41; 363/71
(58) Field of Search ............................... 363/41, 43, 37, 363/71, 39, 97, 98, 132, 136; 307/82, 83, 107, 227, 228; 318/807, 808, 811

(56) References Cited

U.S. PATENT DOCUMENTS

| | | | |
|---|---|---|---|
| 3,581,212 A | * | 5/1971 | Mcmurray .................. 327/105 |
| RE28,986 E | * | 9/1976 | Heinrich et al. .............. 307/82 |
| 5,625,545 A | | 4/1997 | Hammond |
| 5,734,565 A | | 3/1998 | Mueller et al. |
| 5,751,138 A | | 5/1998 | Venkata et al. |
| 5,933,339 A | * | 8/1999 | Duba et al. ................... 363/71 |
| 6,198,178 B1 | * | 3/2001 | Schienbein et al. ........... 307/82 |
| RE37,126 E | * | 4/2001 | Peng et al. .................. 363/137 |

OTHER PUBLICATIONS

Corzine "Use of Multi–Level Inverters to Reduce High–Frequency Effects in Induction Motor Drives" pp. 1–8, No Date.
"Symphony Made Simple" Product Brochure for Multi-Level Inverter, Alstom Power Conversion, Issue 1.01, (2000) pp. 1–12, No Date.

* cited by examiner

*Primary Examiner*—Rajnikant B. Patel
(74) *Attorney, Agent, or Firm*—Faegre & Benson, LLP

(57) ABSTRACT

Apparatus for generating a high time-varying AC voltage using low voltage power semiconductors arranged in series bridge circuits, each powered by an independent DC source. At least one bipolar output pulse width modulation bridge circuit and at least a pair of bipolar output square wave generator bridge circuits have their outputs added together and passed through a low pass filter to form a time-varying, typically sinusoidal, AC output waveform. A first square wave generator has an output with a relative magnitude of 6, a second square wave generator has an output with a relative magnitude of 2 and the pulse width modulator has an output with a relative magnitude of 1. Additional square wave generators of relative magnitude 6 may be added to increase the output voltage.

28 Claims, 14 Drawing Sheets

STEP SWITCHED PWM SINE GENERATOR

BACKGROUND OF THE INVENTION

This invention relates to the field of DC to AC inverters, particularly those producing power at a high voltage sinusoidal waveform for powering equipment requiring high voltage AC power at frequencies or voltages that are independent of the frequency or voltage of a conventional AC power source.

In the past, systems to convert DC to high voltage AC suffered from various shortcomings. The available AC output voltage from inverters was generally limited by the voltage rating of available power semiconductors in the converter. In the past, operating power semiconductors in series had not been seen as a practical solution because of the difficulty in achieving simultaneous switching of series sets. Nevertheless, in the present invention, several methods are described for operating a number of AC power stages in series wherein the output AC voltage can be achieved at arbitrarily high levels.

The need for such inverters is usually in the operation of high power motors. It is common for such motors to require input voltages in the range of 4.16 KVAC to 13 KVAC. If a voltage of 4.16 KVAC is to be generated in a single stage, and if the power semiconductors are selected to have a conservative 50% voltage margin, then the DC source voltage must be approximately 3600 VDC and the semiconductors would require a rating of 5400 Peak volts. In order to deliver controlled AC voltage with low harmonics to an AC load, it is generally a requirement that the switching speed be high. However, high voltage devices tend to have high switching losses and so it is not practical to use high voltage power semiconductors to control high AC output voltages in systems requiring high repetition rates for the switching devices.

One alternative is to use a plurality of series connected pulse width modulation (PWM) inverters to achieve high AC output voltages. However this alternative is relatively expensive and complicated.

The present invention achieves high frequency switching and use of high voltage semiconductors without incurring high switching power losses. The present invention utilizes a pair of step wave generators in conjunction with a single PWM inverter in series connection to generate each phase of the AC output voltage. Since the step wave generators are operated at a relatively low frequency (low repetition rate), high voltage devices are readily available for such duty. A single set of relatively low voltage power semiconductors are operated in PWM mode (at a relatively higher frequency) to "fill in" the steps in the waveform generated by the step-wise output of the step wave generators or inverters.

DETAILED DESCRIPTION OF THE INVENTION

The present invention uses a pair of step wave generators (SWG) or voltage inverters along with a pulse width modulator (PWM) to form waveform segments to "build" a sinusoidal voltage waveform having a voltage in excess of the voltage of any of the step wave voltages or the pulse width modulated waveform alone. In particular, in a preferred embodiment, two step wave generators have an amplitude ratio of 6 to 2, along with a pulse width modulator having an amplitude of 1. More particularly, one step wave generator has an output of ±6 units, while the other step wave generator has an output of ±2 units, and the pulse width modulator has an amplitude of ±1 unit. Such an arrangement enables utilization of power semiconductors to deliver an ultimate voltage waveform output that is higher than the voltage ratings of the devices used, without subjecting the semiconductors to over voltage stresses, while not requiring dedicated balancing circuitry or a control to regulate the voltages across series connected devices.

Figure 1:
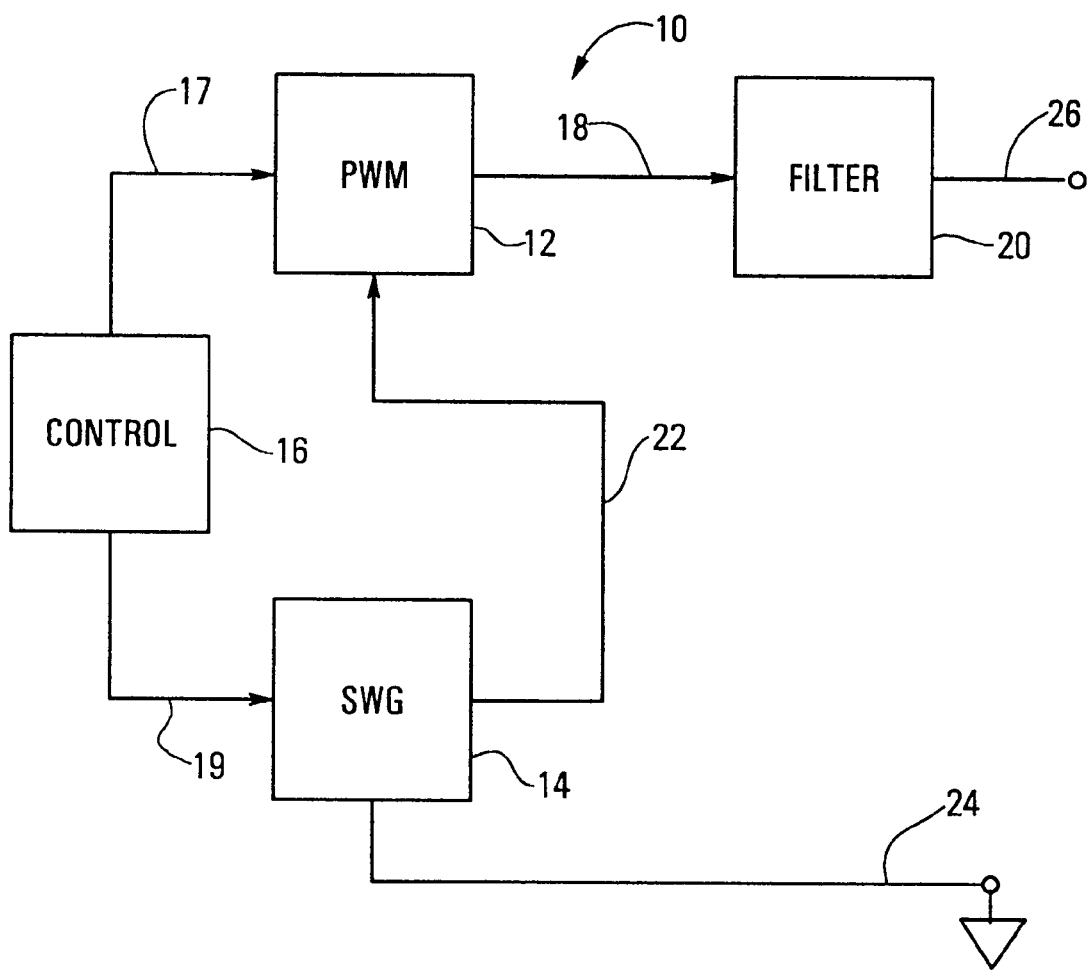
FIG. 1 is a block diagram useful in illustrating aspects of the present invention showing one step wave generator and one pulse width modulator.

Referring to FIG. 1, a block diagram 10 of a system having a pulse width modulator (PWM) 12 and a step wave generator (SWG) 14 may be seen. PWM 12 and SWG 14 are each controlled by a control circuit 16 via lines 17 and 19, respectively. A first output of the step wave generator 14 is connected to the pulse width modulator via line 22 and a second output of the step wave generator 14 is referenced at line 24 as circuit common (or a floating neutral, for three phase applications). The system output appears at an output of the filter 20 on line 26, referenced to system neutral 24. The voltage appearing across the inductor 32 is only that generated by the PWM inverter, because the step transitions generated by the step wave inverter are canceled by the opposing switch action of the PWM inverter. Although not shown in FIG. 1, it is to be understood that appropriate isolated power supplies for each of blocks 12 and 14 are included. These isolated power supplies must be transparent to power flow so that current flow back to the power supply has little effect on the DC voltage levels. It is to be understood that the power supply for control block 16 is independent of the supplies for blocks 12 and 14.

Figure 2:
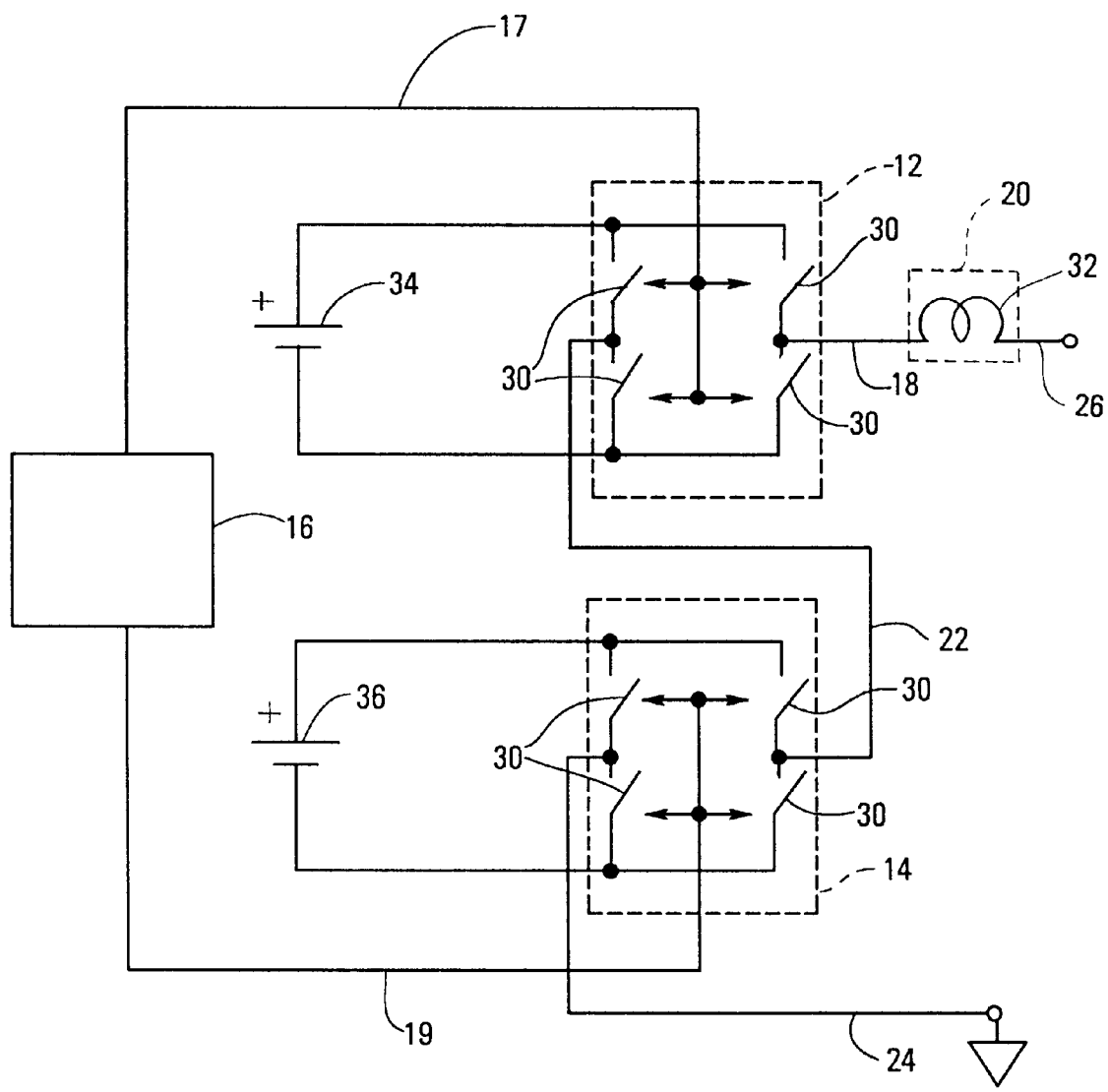
FIG. 2 is a simplified partial schematic corresponding to the block diagram shown in FIG. 1.

Referring now to FIG. 2, each of blocks 12 and 14 are (in simplified schematic form) seen to include a switching bridge circuit made up of 4 switches 30. Although shown as mechanical switches, each switch 30 is to be understood as actually being a power semiconductor. Furthermore, the respective switches 30 need not all be the same type of power semiconductor. The switches in the PWM block 12 need to be operable at relatively high frequency to provide a pulse width modulated waveform on line 18, to be filtered by inductor 32 in filter block 20. Switches 30 in the SWG block 14 need only be able to operate to provide a square wave on line 22. Batteries 34 and 36 are shown to illustrate the respective DC power sources for the PWM and SWG circuits 12 and 14, and are not to be taken literally, as other forms of DC power sources will actually be utilized.

Figure 3:
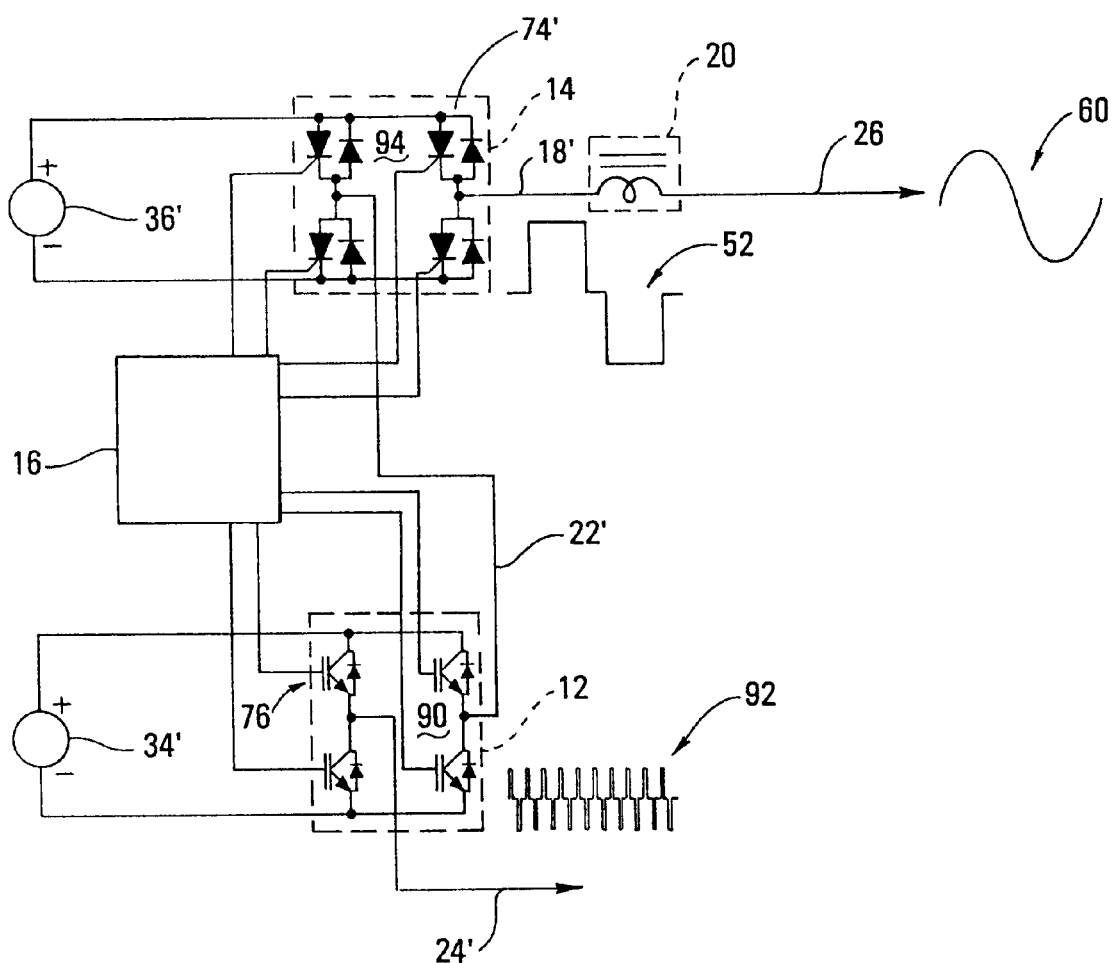
FIG. 3 is a more detailed partial schematic of the embodiment shown in FIG. 2.

Referring now also to FIG. 3, a more detailed, but still simplified partial schematic of the system of FIGS. 1 and 2 may be seen. This may be understood to be one of three phases of a two stage inverter, although only one phase is shown. Here, PWM 12 is connected to circuit common 24' and line 22' connects the PWM 12 to the SWG 14 which is connected via line 18' to filter 20 and output line 26. FIG. 3 shows a circuit topology with the locations of the PWM 12 and SWG 14 interchanged to illustrate that it is within the scope of the present invention to connect the PWM subcircuit 12 and the SWG subcircuits 14 in any order, provided that the subcircuits are connected in series relationship. A DC source 34' of, for example, 750 volts supplies the PWM 12, and a DC source 36' of, also by way of example, 1500 volts supplies the SWG 14. PWM 12 has a bridge 90 preferably formed of four insulated gate bipolar transistors (IGBT's) 76.

Figure 4:
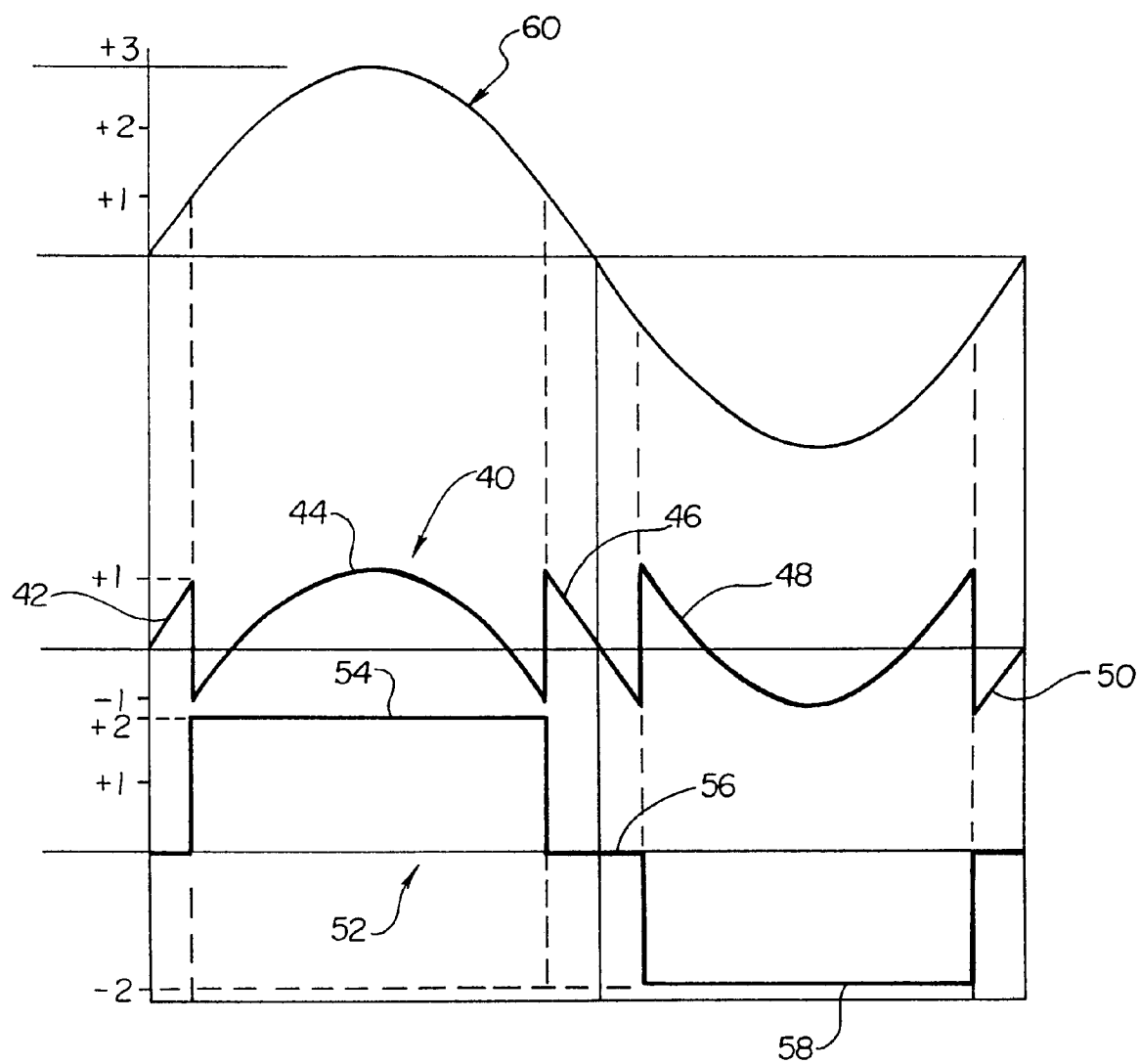
FIG. 4 is a set of waveforms corresponding to operation of the system shown in FIGS. 1, 2 and 3, useful in illustrating the operation of the present invention.

Referring now also to FIG. 4, waveform 92 illustrates that the effective envelope of PWM output on line 22' is capable of providing positive or negative output pulses having fixed maximum and minimum values, although, in operation, the output on line 22' will have an effective envelope indicated by waveform 40. SWG 14 is preferably made up of a bridge 94 of four power switching devices 74. It is to be understood that back diodes are connected across each IGBT and power switching device. In the past, GTO (Gate Turn Off) devices were considered desirable as well suited to switching high voltages at low frequency. However, with the advent of higher rated voltage Insulated Gate Bipolar Transistors (IGBT's) with lower loss, greater simplicity of drive circuitry, and cost, the use of GTO devices has been largely superceded. Nevertheless, GTO devices could still be used, if desired, for the power switching devices 74. In the case of IGBTs, it is common practice to include the back diode in the IGBT semiconductor package, while in the case of GTOs, the back diodes are usually separate devices.

Waveform 52 illustrates the output of the SWG 14 on line 18 (without showing the PWM waveform superimposed). A sine wave output appears on line 26 as indicated by waveform 60. As indicated in FIG. 4, (and ignoring losses, for simplicity) the DC supply 34' may be thought of as 1 unit of voltage, and the DC supply 36' providing 2 units of voltage. The sine wave output will then be between 0 and 3 units of voltage (peak value). The PWM rate for waveform 92 is preferably above 10 KHz to minimize audible sound. Waveform 40 is a segmented representation of an output of the PWM subsystem 12. It is to be understood that the actual waveform on line 18 will be a bipolar pulse train with varying pulse width but fixed peak amplitude. The ON and OFF time of each pulse will vary to create the correct average magnitude waveform for a particular time interval for successive pulses so that the effective full cycle waveform is that depicted. Waveform 40 is shown as a succession of segments 42–50 of a sinusoidal AC waveform to aid in the understanding of the operation of the present invention, even though the actual waveform is a bipolar pulse train, as is illustrated in FIG. 3. The width and polarity of the pulses of the PWM output may be varied as desired. It is to be understood that segment 42, starting at zero degrees in the sinusoid, is really the second half of a segment, the first half of which is segment 50. In the illustration of maximum available sine wave voltage the initial segment (made up of half segments 42 and 50) starts at −arcsin(0.33)=19.26 degrees (or 340.73 degrees, using modulo 360 arithmetic). The second segment 44 extends from 19.26 degrees to 160.73 degrees. The third segment extends from 199.27 degrees to 340.73 degrees. It is to be understood that in continuous operation, the segments 42–50 then repeat themselves continuously in that order. In this embodiment, the peak magnitude of the segments 42–50 is ±1, and this waveform has a fundamental frequency of (preferably) 5 times a base frequency of the fundamental sine wave, the half period of which equals the length of the sum of segments 44 and 46. The combined switching waveforms are able to control AC output voltage to produce a sinusoidal waveform from zero magnitude to magnitude 3. It is to be understood that the numerical values listed above apply only to operation resulting in the maximum possible magnitude of AC voltage.

The SWG (sine wave generator) subsystem 14 produces a quasi-square wave waveform 52 having three states: a +ON state 54 with a magnitude of +2, a ZERO state 56 (connected to circuit common 24) with a magnitude of 0, and a −ON state 58 with a magnitude of −2. It is to be understood that the SWG subsystem is controlled to be in the ZERO state 56 during half segments 42 and 50 as well as during segment 46. In operation, the SWG waveform 52 will repeat itself over and over, controlled by the control subsystem 16 to be synchronized with the segments 42–50 of the PWM subsystem 12. In a manner to be described in more detail infra, waveform 52 is added to the pulse train represented by waveform 40, resulting in sine wave 60 having a maximum amplitude of 3. It is to be understood that the magnitude values expressed above are merely relative numbers, and that the actual voltages may be as desired. It should also be noted that the waveform targeted may be other than sinusoidal, if desired, and furthermore, harmonics may be included in the target.

Once the waveforms 40 and 52 are added together, the result is passed through the filter 20, resulting in an actual sinusoidal waveform corresponding to sine wave target 60. It is to be understood that the sine wave output can be generated with a high level of precision, so that it is substantially free of harmonics. Remaining traces of the PWM frequency in the sine wave can be reduced using conventional filtering.

A simple L-C filter can be used to reduce the PWM voltage magnitude to an arbitrarily low value. For example, if it is desired to provide a 60 Hz sine wave with an RMS magnitude of 1 unit, with the PWM voltage limited to 0.1% of the sine wave. The PWM switching bridge circuit can be made up of two IGBT transistor pairs. Each IGBT pair will be switched at a 6 KHz rate.

Figure 4A:
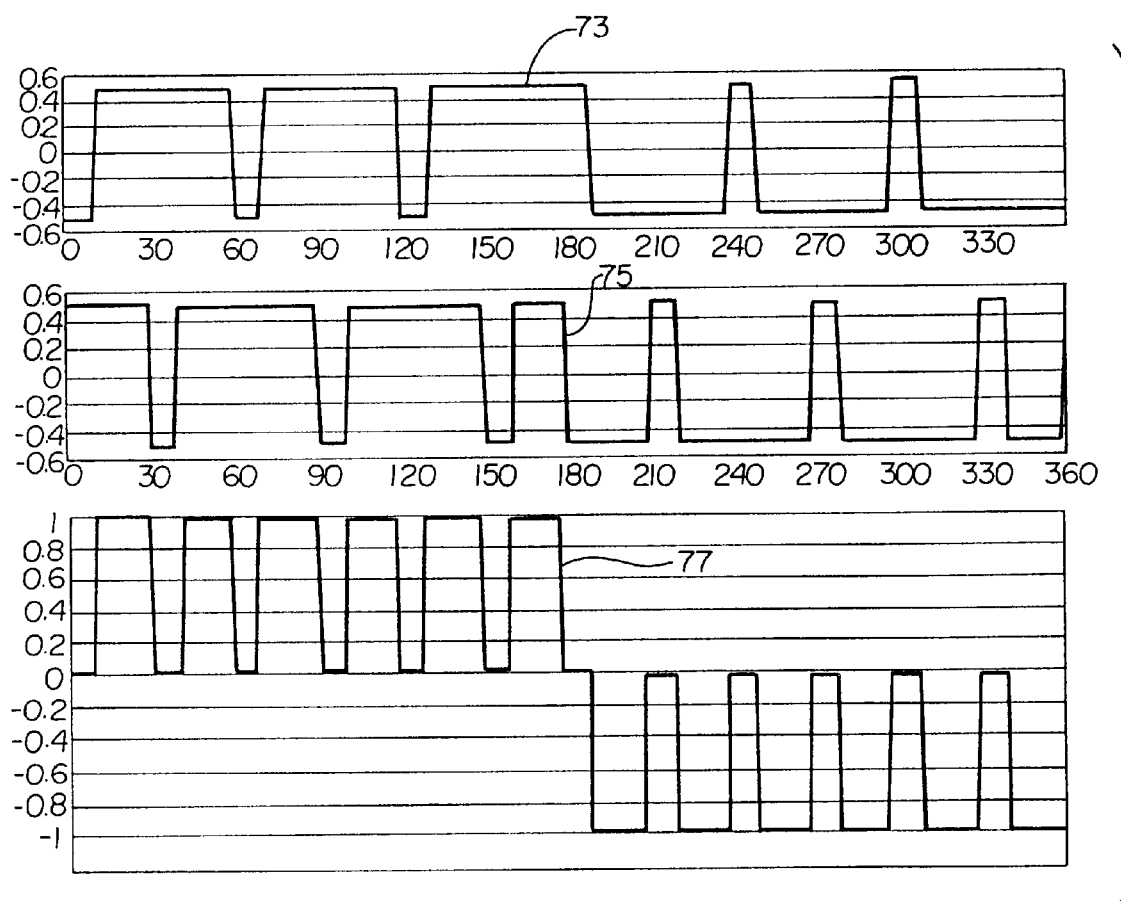
FIG. 4a is a set of waveforms useful in illustrating an aspect of the present invention in connection with producing a PWM output voltage.

The two pairs are operated in combination so that the resultant PWM output is doubled to 12 KHz. Simultaneously, the operation of the two pairs in combination can be made to reduce the PWM voltage to half the magnitude of a single set of IGBT's. Referring to FIG. 4a, waveform 73 represents an output at the center tap of one pair of IGBT's in the PWM, operating from a voltage of ±0.5 units and −0.5 units, so that the total swing in the PWM voltage is equal to 1 unit. Waveform 75 is similar to waveform 73, except shifted by 180 degrees and inverted. Waveform 77 is the resultant of a summation of waveforms 73 and 75. It is to be noted that the frequency in waveform 77 is twice that of waveforms 73 and 75. It is to be further noted that waveform 77 has the same "peak" magnitude as the waveforms 73 and 75, the "peak-to-peak" magnitude is doubled, thus reducing the percent of PWM voltage by a factor of 2.

As an approximation, the PWM component of voltage is 60% of the sine wave output voltage. The expression "PWM component of voltage" means all frequencies that are at the PWM frequency or harmonics of the PWM frequency. This is because the RMS value of voltage having a sine wave form is 0.707 of the peak voltage, whereas the RMS value of a square wave is 1.0 times the peak voltage. A square or rectangular wave can be considered to be the sum of harmonics in a Fourier series that represents a square wave. With a square wave having a magnitude of 1, the "nth" harmonic will have a magnitude of 4/(n×pi) or 1.27/n. Setting n=1 yields the result that the peak magnitude of the fundamental frequency in the PWM waveform may be as high as 1.27 for a square wave of magnitude 1.

The PWM waveform higher harmonics are attenuated by an LC filter inversely as the harmonic magnitude squared. For example, the $5^{th}$ harmonic has a magnitude of only 20% of the fundamental. It is attenuated by an L-C filter as $1/(5)^2 = 1/25$. Thus the $5^{th}$ harmonic has a magnitude of $\frac{1}{25}^{th}$ of the fundamental at the output of the filter. Higher harmonic frequencies that are in the PWM waveform are attenuated by much higher factors than the fundamental frequency in the PWM waveform.

The magnitude of PWM voltage that represents a sine wave is varying in effective magnitude throughout the sine wave cycle. As the sine wave crosses zero, the PWM fundamental component output from the bridge circuit is equal to 1.27×0.5=0.635×the sine wave magnitude. The effective PWM voltage magnitude changes with each cycle, until it has a minimum value when the sine wave is at a peak. As a practical matter, the PWM waveform maximum voltage must be higher than the magnitude of any waveform that is being targeted and defined by the PWM switching pattern. Because of the variations in the PWM waveform over a full cycle of the target waveform, the effective fundamental component in the PWM waveform can only be approximated. The 60% magnitude value mentioned above is only an estimate of what might be expected in practice.

When a step wave of magnitude double that of the PWM bridge is added to the output of the PWM bridge, the PWM voltage becomes 60%/3=20% of the targeted sine wave voltage. Using an L-C circuit to filter the AC output, an inductor may be used which has an impedance of 0.05 of the load impedance, it being understood that one unit of load impedance is equal to the output voltage rating of an inverter divided by the output current rating. For example, using a 100 KVA 60 Hz inverter with an output voltage of 3 phase 480 VAC line to line or 277 VAC line to neutral, the rated output current is 100,000/(sqrt 3×480)=120 amperes. One unit of voltage is 277 VAC, and one unit of current is 120 Amps, AC. For a WYE connected load, one unit of impedance is 277/120=2.3 ohms. An impedance of 0.05 units for this example will be 0.05×2.3=0.115 ohms. Corresponding inductance is: impedance/(2×pi×frequency)=0.115/(2×pi× 60)=0.000305 Henrys. If the PWM frequency is 12 KHz, the PWM frequency impedance (i.e., the impedance at the PWM frequency) is then 0.115×12,000/60=23 units. Since one unit is 2.3 ohms, the actual impedance of the inductor at the PWM frequency will be 2.3×23 or 52.9 ohms. It is to be understood that the process of selecting the filter inductor starts with an estimate of what remaining value of PWM current will be acceptable in the output to the filter capacitor and load circuit. Then an estimate is made of the maximum fundamental value of PWM current that will be present at the source. The filter inductor impedance must then be equal to (PWM voltage)/(acceptable maximum PWM current). In making such calculations, it has been found convenient to use per unit values. It is also to be understood that for conventional filter values, the resistance is negligible, permitting use of scalar arithmetic, instead of vector arithmetic.

A capacitor of conductance 0.1 at 60 Hz will have a conductance of 200×0.1 =20 units at 12 KHz. The attenuation of the PWM voltage will then be approximately 1/(20×10)=0.05. This value multiplied by the 20% PWM voltage equals a factor of 0.001 or 0.1%.

Turning now to control subsystem 16, the most direct strategy for control is to utilize a real time digital controller which will compute the target value of currents (or voltages) ahead of each time cycle. If a 12 KHz PWM frequency is used, then a time interval for the period of the PWM waveform will be 1/12000 seconds, or 83 microseconds. This provides adequate time to determine the source voltage which is made up of the step waves and the PWM wave for the next portion of the cycle. The fact that the calculation is made in the time interval before action takes place is compensated by taking into account where the target voltage must be at the (subsequent) time of execution. By using digital control, harmonics generated by the load can also be compensated, so that the sine wave will be accurate regardless of non-linearities in the load. One known simple and effective method for harmonic removal is to digitize the output waveform and analyze the digital data to extract and then subtract the fundamental component from the data, leaving only harmonic data. Next, the difference data (the harmonic data) is subtracted from a subsequent waveform, and the process is repeated, with confirmation of the result obtained by digitizing a following actual waveform. The process is preferably repeated, which will also take harmonic variations due to time varying load changes into account Referring now to FIG. 5, a block diagram of an embodiment or system 70 of the present invention may be seen. It is to be understood that, with the addition of a second square wave generator (SWG2) 72, the phase timing of the pulses resulting in the sine wave segments delivered by the PWM 12 and the state changes of the waveform delivered by the first square wave generator (SWG1) 14 are varied from those described in FIGS. 1–3. The stepped or staircase waveforms may be referred to as "quasi-square wave" waveforms.

Figure 5:
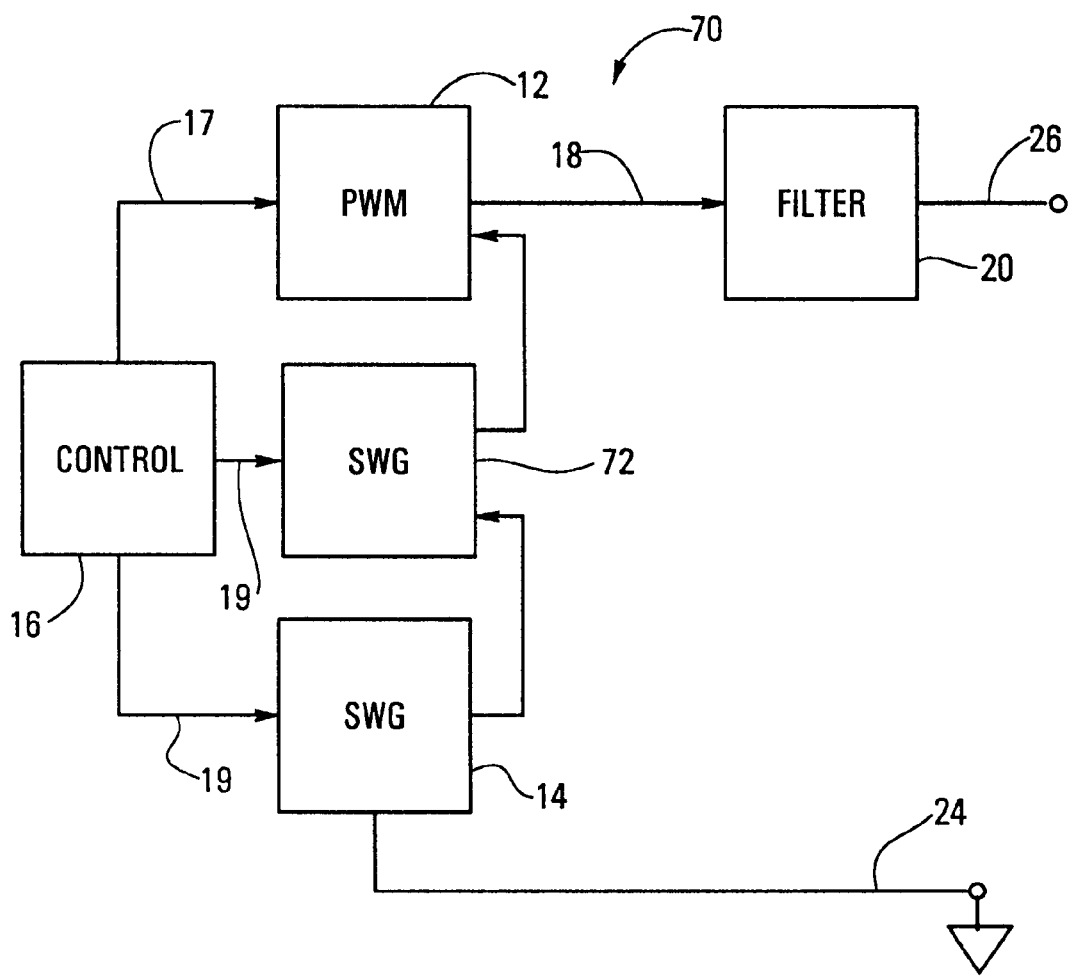
FIG. 5 is a block diagram of the present invention showing two step wave generators and one pulse width modulator.

The system 70 of FIG. 5 may be used construct a three-phase high voltage AC supply, when three identical systems 70 are tied together at circuit common 24 and the three systems are timed 120 degrees apart. In system 70, Bridge A (in block 14) and Bridge B (in block 72) each have an output that is a quasi-square waveform and Bridge C (in block 12) produces a PWM output.

Figure 6:
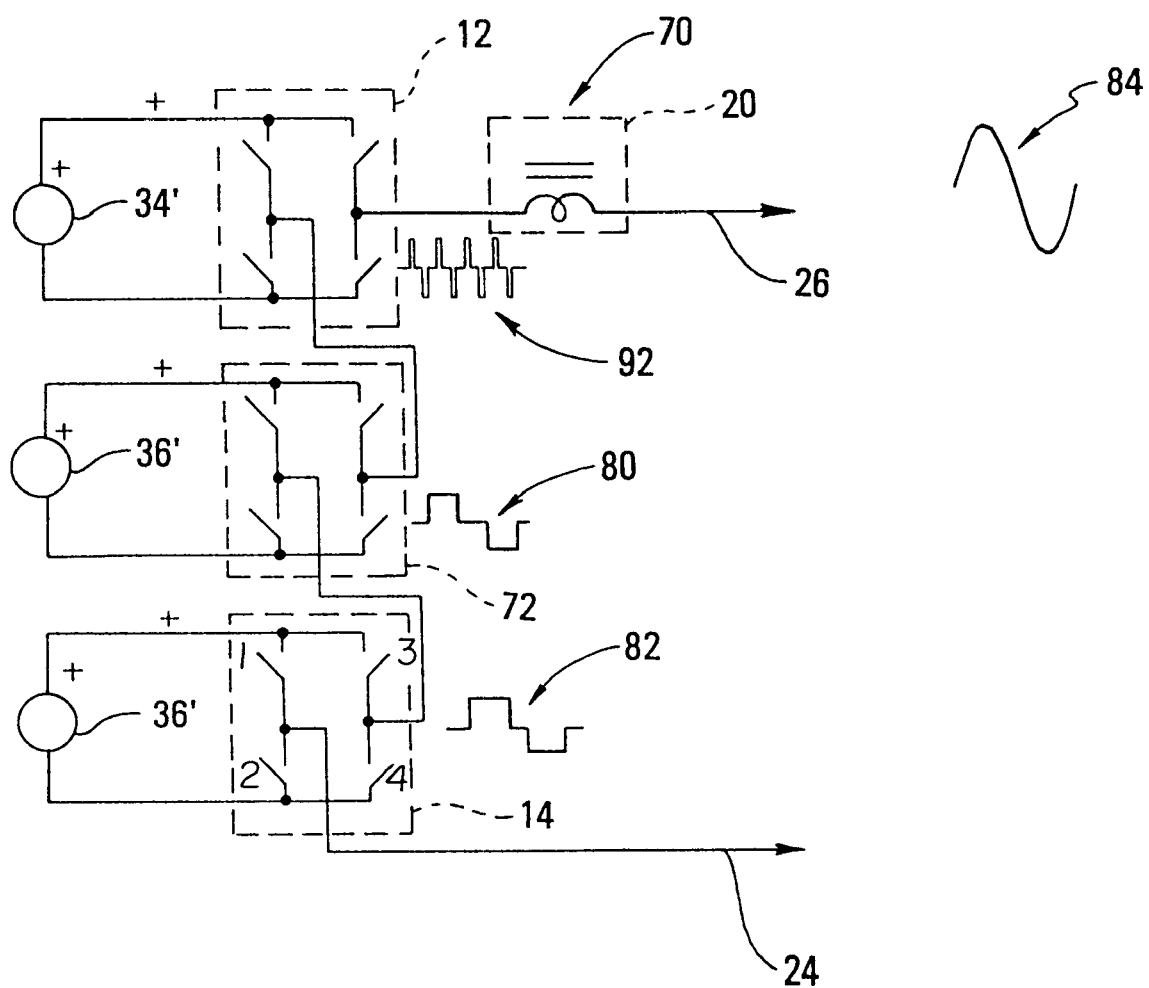
FIG. 6 is a simplified partial schematic of the block diagram of FIG. 5.

The objective is to create a relatively smooth target voltage waveform, which usually would be a sinusoidal voltage, although it is within the scope of the present invention to form waveforms other than sinusoids, if such is desired. Bridge A has the switches numbered 1 through 4, as shown in FIG. 6. In FIG. 6, it is to be understood that waveforms 80, 82, 92 and 84 are not to scale and do not necessarily include details (nor scale factors) of their respective wave shapes, but are shown in simplified form to indicate only the type of waveform present. More particularly, waveforms 80 and 82 are to indicate quasi square waves at the output of SWG 13 and SWG 72. Waveform 92 indicates a pulse train at the output of PWM 12, and waveform 84 indicates a sinusoidal output at line or terminal 26.

To obtain a zero output from bridge A, switches 2 and 4 are closed while switches 1 and 3 are open. Alternatively, switches 1 and 3 may be closed while switches 2 and 4 are held open. To obtain a positive voltage from bridge A, switches 2 and 3 are closed while switches 1 and 4 are opened. To obtain a negative voltage from bridge A, switches 1 and 4 are closed while switches 2 and 3 are opened. To obtain a quasi voltage waveform the switches 1–4 are operated synchronously with the target AC output voltage at the same frequency and in phase.

A second quasi waveform 80 from bridge B may be added to the waveform 82 from bridge A, with the quasi waveform 80 from bridge B changed in timing as compared to that from bridge A, so that the summation more closely approaches the target waveform. Similarly, it is to be understood to be within the scope of the present invention to add additional quasi-square waves, such as $3^{rd}$, $4^{th}$, $5^{th}$ etc. quasi-square waves to more closely approach the target waveform.

Bridge C (in block 12) is operated in a PWM mode at a frequency very much higher than the fundamental frequency of the target voltage waveform. Bridge C is operated in such a manner as to fill in the steps of the quasi square wave forms, so that the resulting waveform can quite precisely approach the targeted sinusoidal voltage waveform.

Filter 20 preferably has a low pass characteristic to eliminate or minimize harmonics resulting from the PWM output on line 18, and the result is a relatively smooth sine wave 84. This can provide a waveform in which undesired harmonics are substantially eliminated.

It is to be noted that each switching bridge circuit requires its own isolated DC power source. Thus for the circuit 70 illustrated in FIG. 5, a total of nine isolated DC power supplies are required to produce a 3 phase AC output voltage. When more stages are required to attain the target voltage, more DC sources must be added.

The various circuits of the present invention are well suited for applications extending up to high voltage, high power AC motor control systems. In such high power applications it is often the case that no individual power semiconductor is available with adequate current rating to match up with the actual load. In this event, multiple bridge semiconductor bridge circuits are required in order to manage the power. In the practice of the present invention, placing switching bridge circuits in series assures current sharing between stages. Operation of the motor at a high AC voltage keeps the AC current levels at low values that reduce current loading of the conductors in the motor stator.

When the neutral is floating, triplen harmonics may be deliberately introduced into the target waveform. Introduction of these harmonics permits operation at a lower DC voltage applied to each switching section and the triplen harmonics are eliminated in the line to line voltages by the floating neutral connection. If approximately 15% of $3_{rd}$ harmonic is introduced into the target sine wave form in phase with the fundamental, then the peak of the resulting voltage wave is reduced in the ratio of 1:1.15, or about 0.87%, of the sine wave by itself. Now the DC voltage at the source can be reduced in this same ratio. The result will be an output waveform of the same shape as the target, which is the combination of a fundamental and a $3^{rd}$ harmonic. However, in the 3 phase configuration the $3^{rd}$ harmonics cancel, leaving only a relatively pure sine wave in the line to line connection.

If the target waveform is 4160 VAC line to line, the line to neutral will be 2400 VAC. This sine wave will have a peak value of 1.41 times the RMS value and to make up for losses this is desirably increased to approximately 1.5. Multiplying 1.5×2400 VDC=3600 VDC. If the lowest voltage semiconductor must support ⅕ of this value, the DC voltage for the PWM stage must be 3600/5=720 VDC. However, with the introduction of the $3^{rd}$ harmonic in the target waveform this is reduced by a factor of 0.87=626 VDC. This would permit use of 1200 volt IGBTs instead of 1400 volt rated IGBTs. There will then be a substantial reduction in switching losses in the lower voltage IGBTs. Similarly, the high power stages must each support 20% of 3600=1440 VDC, and this is reduced to 0.87×1440=1250 VDC. This permits use of readily available 2500 VDC IGBTs for the square wave switching semiconductors.

The quasi-square waveforms have the advantage that the repetition rate is low and so switching losses are low. The disadvantage of using only quasi waveforms to construct a target voltage is that the steps create low frequency harmonics that are difficult to filter.

The advantage of using PWM switching waveforms to create the target waveform is that all of the low frequency harmonics that are not targeted can be eliminated by the switching algorithm, leaving only the high PWM frequencies to be filtered. If the low frequency harmonics were allowed to remain, they would be difficult to filter in that components required are tend to be large and heavy, and incur high losses. In contrast, the filter components for the higher frequency harmonics only require small, light weight, and low loss components. Furthermore, low frequency harmonics are particularly bad for motor drives, because they cause torque ripple and heating in the motor. Torque ripple can cause an increase in audible noise in the motor, and may limit the motor from being able to supply rated output torque.

Reduction of low frequency harmonics in a non-linear load can be accomplished by the control algorithm, with only a small additional cost. In contrast, however, the PWM frequency can only be removed by filtering.

Figure 8:
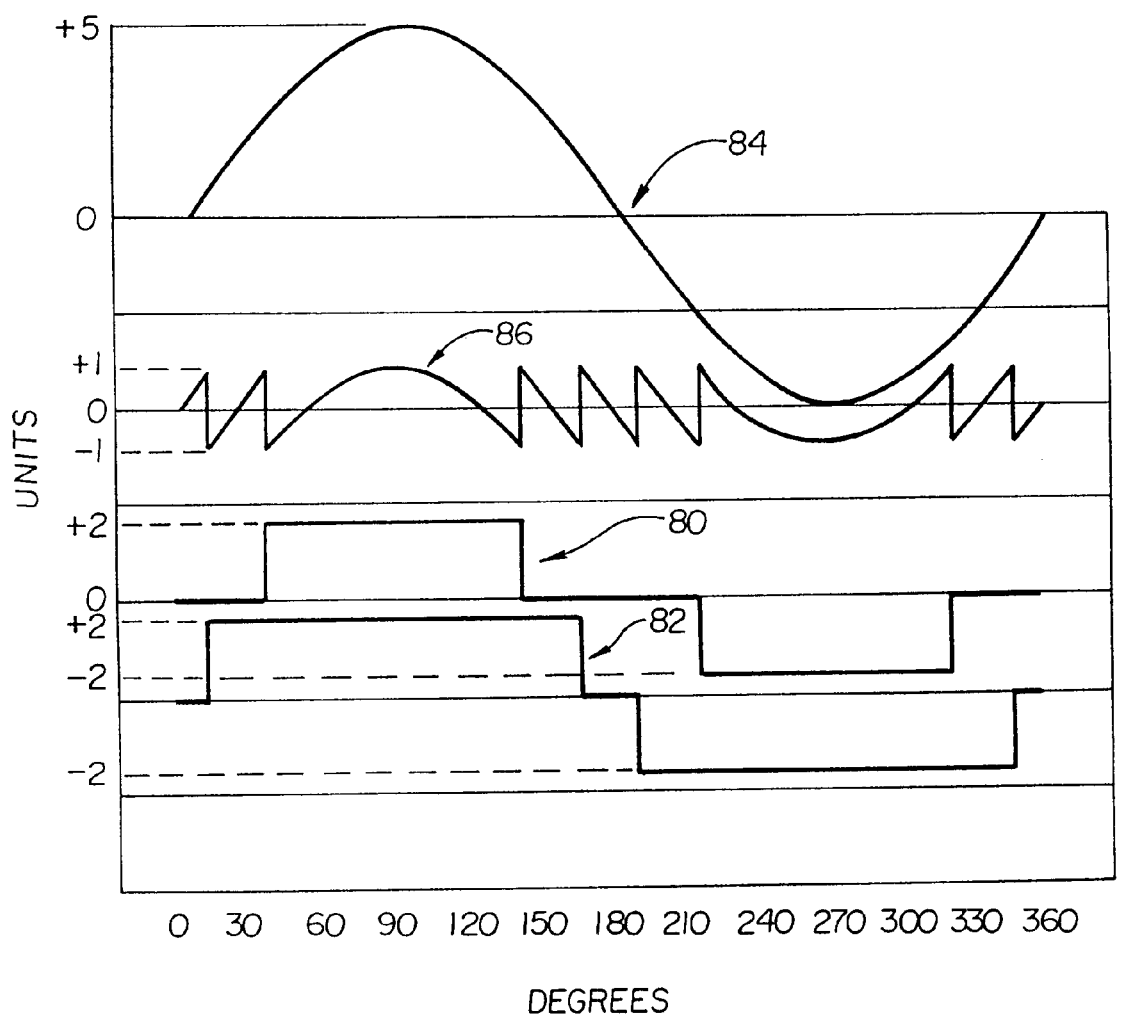
FIG. 8 is a set of waveforms corresponding to the embodiment shown in FIGS. 5, 6 and 7 illustrating further aspects of the present invention.

In the system described for FIG. 8, the combination of a PWM stage having an output at ± one unit, and having two step wave generators, each with an output of ±2 units results in a PWM voltage output that is only ⅕ of the resulting sine waveform. As a consequence, the output filter only needs to handle 20% of the voltage. This is one of the benefits of this invention.

The switching algorithm is a mathematical process by which the magnitude and timing of the step waveforms and the PWM waveforms are calculated in order to achieve the target value of the desired waveform. In general, more than one technique is available to accomplish this task. When a "real time" algorithm is used (in contrast to a look-up table) the equations must generally use only few steps because of time of execution limitations. One method to establish a switching pattern to create the PWM waveform is as follows.

Figure 5A:
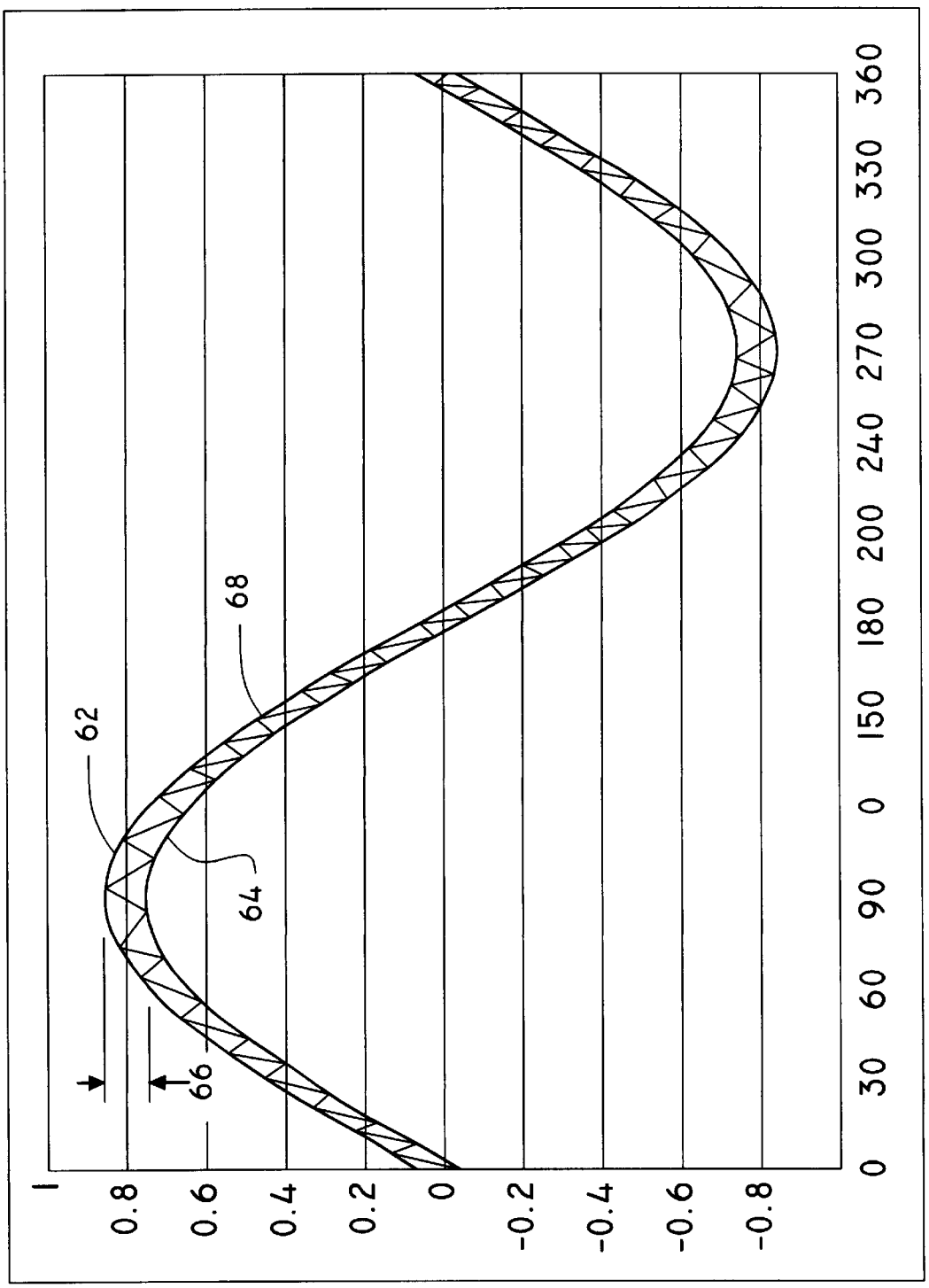
FIG. 5a is a pair of sine wave forms showing certain aspects of the operation of the switching algorithm.

A. First, a digitized sine wave of current is established. Next, two copies are made, with a small, fixed value of amplitude, α, added to one copy 62 and subtracted from the other copy 64 to result in two sine waves offset in amplitude by a value 66 2α apart, as shown in FIG. 5*a*. The output circuit must include a significant inductance and bypass capacitor to filter the PWM harmonics from the output sine waveform.

B. Next, the output is connected to the positive DC bus until the AC output current reaches the upper limit target current. Then the output is connected to the negative DC bus until the AC output reaches the lower limit target current.

C. Repeating this process continuously results in an output waveform that is never higher in value than the upper sine wave, nor lower than the lower sine wave, as shown in FIG. 5*a*. The value of a can be made arbitrarily small, to limit the error in the output waveform. The AC output oscillates between the upper limit of waveform 62 and the lower limit of waveform 64, as shown by the waveform 68.

Figure 5B:
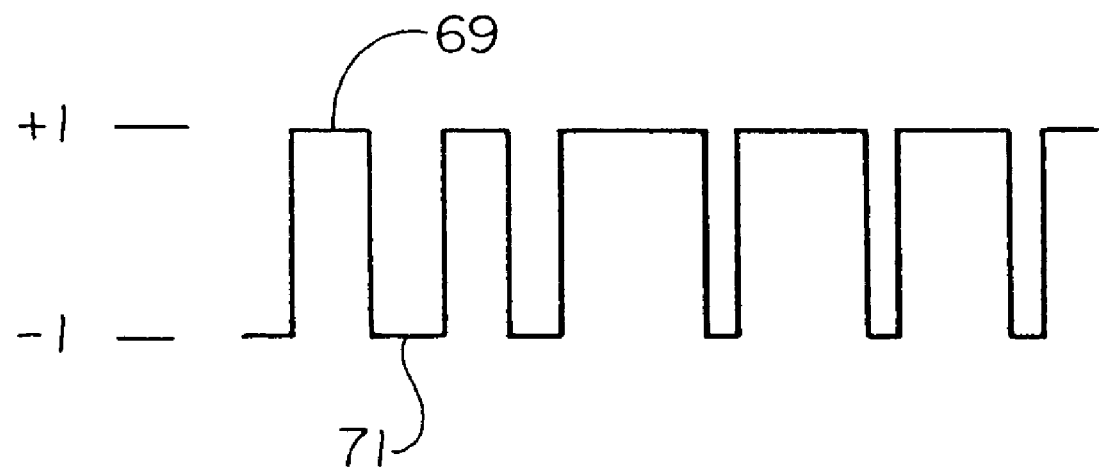
FIG. 5b is a simplified view of a pulse width modulated waveform according to one aspect of the present invention.

This method involves the control of the output current, I, and as consequence, the output voltage $E^T$ is controlled. The target current waveform illustrated in FIG. 5*a* is a sine wave with a magnitude of 0.8 units. The PWM voltage is always either at a ±1 unit or a −1 unit output, as indicated respectively at levels 69 and 71 in FIG. 5*b*. The actual current varies between a value that is set above the target (corresponding to $E_T+\alpha$) and a value that is set-below the target (corresponding to $E_T-\alpha$). FIG. 5*a* illustrates upper and lower limits with α=0.05 units.

If it is assumed that the output voltage is sinusoidal (in response to a sinusoidal current flowing in a linear load) then the drive voltage will be the instantaneous difference between the PWM voltage and the output voltage. Whenever the current reaches the upper target level, the PWM voltage is reversed. Current then falls at a rate equal to $(-1-E_T)/L$. When the current reaches the lower limit, the PWM voltage goes to +1 and the current rises in ratio to $(1-E_T)/L$ until it reaches the upper limit. Thus the actual current is oscillating between preset limits above and below the target current.

It is to be understood that this type of PWM control does not have a fixed cycle time. the PWM cycle time is set by the integration process that causes current changes. Consequently, the PWM rate varies throughout the sine wave cycle. This type of control has been found to be satisfactory for motor speed and torque controls, since torque is approximately in ratio to the current. This means that motor torque can be controlled independently of motor speed, over a relatively wide range.

The particular method described above has been used successfully in actual applications, even though it has a disadvantage in that the PWM waveform is not synchronous with the waveform copied, possibly introducing unwanted "noise" in the waveform.

A second alternative control algorithm is as follows. A digitized sine wave is established in the control logic. The sine wave is approximated by making it stepped. In order to make the calculations simple, the steps are made to correspond to a fixed time interval, preferably 2 degrees. It is preferable to make the PWM frequency an integer divisor of the period of the output waveform. If it is not, undesirable sub harmonics will result and the positive and negative half cycles may not have symmetry. If the output waveform is to be 60 Hz and the PWM operation is at 180 steps per cycle, then the PWM rate would be 180×60=10,800 Hz. Each step is assumed to cross an ideal sine wave at the center of the step. The objective is to make the output from each step have an average value that is equal to the waveform value in the logic that is the target. The DC source voltage must be higher in magnitude than the peak of the target sine wave. Assume a DC voltage of 1.2 units. This value applies to the output voltage. For example, the step that extends from 179 to 181 degrees must provide an average voltage of zero, corresponding to 180 degrees. The time interval [T] for one step is 1/(60×180)=92.6 microseconds. Here the PWM voltage must be at +1.2 units for half of the step interval and −1.2 for the balance of the step interval, in order to achieve an average voltage of zero. The time intervals for positive and negative voltages required to achieve the correct voltage for 45 degrees where the average value of voltage=0.7071 is as follows. For a time interval [a], the value is positive, and for a time interval [T−a] the value is negative. Using $0.7071=[1.2\times a-1.2\times(T-a)]/(92.6\times 10^{-6})$, a=73.58 microseconds with a value of +1.2 and [T−a] =19.02 microseconds with a value of −1.2. It is to be understood that if the DC voltage changes, the averaging process will make the necessary correction in the positive time interval and the negative time interval for each PWM cycle.

It is to be understood that the PWM cycles apply to each IGBT pole pair. When the complete bridge circuit is operated with 2 pole pairs, the PWM output frequency is doubled and the PWM output has 3 states which are −E, 0 and +E. (It is to be understood that "E" is equal to the value of the DC bus, and "0" indicates a positive connection to circuit common enabling current flow without any voltage potential at the output terminal, in each case ignoring the forward drop of the conducting power devices in the bridge.) This has the effect of reducing the PWM voltage at the bridge output to half of the PWM magnitude for each pole pair. In the example above the apparent PWM frequency becomes 2×10.8=21.6 KHz and the peak to peak voltage is E and not 2E as in the calculation.

A feedback circuit and voltage attenuator are connected to the actual AC output voltage so that the sine wave in the logic and the sampled and attenuated actual output waveforms will be matched. The overall magnitude of the actual output voltage is controlled by adjustment of the attenuated sample waveform. The feedback circuit automatically changes the output by multiplying the error signal by the gain in the logic to provide the correct target sine wave of voltage. If harmonic correction is to be included, the harmonics must be added to the target waveform in the logic. This correction is done not more than once per complete 360 degree cycle. Since a harmonic frequency is always an integer multiple of the fundamental waveform, one complete cycle of the AC output fundamental and the desired harmonic must be presented as the target for the PWM operation to copy.

One disadvantage (of using a PWM switching waveform to create the target waveform) is that the semiconductors that are typically used for PWM duty usually exhibit high switching losses. Further disadvantages are that the high switching frequencies create high losses in filter components and may cause substantial audible noise. In the practice of the present invention, these disadvantages are reduced in their effect because the PWM is used only for a portion of the output waveform, in contrast to using a PWM alone.

By means of a combination of quasi-square waves and PWM waves, the best features of both can be used. Most of the fundamental power is switched in quasi square wave mode, and the PWM is used only to trim the waveform so that the low frequency harmonics that would be exhibited by the quasi square waves alone are eliminated. The PWM waveform in this example deals with a maximum of 20% of the total power. Consequently, low voltage switching devices can be used, which may be operated at high frequencies, limiting switching losses to relatively low levels. In the embodiment illustrated in FIGS. 5, 6 and 7 the power managed by PWM switching is at most 20% of the total maximum power. The only harmonics remaining to be filtered are the high frequency components of the PWM switching and consequently the components of filter 20 can be made small, and losses and noise from the PWM switching are also reduced to 20% of what they would be if the entire output is switched in PWM control mode.

Figure 7:
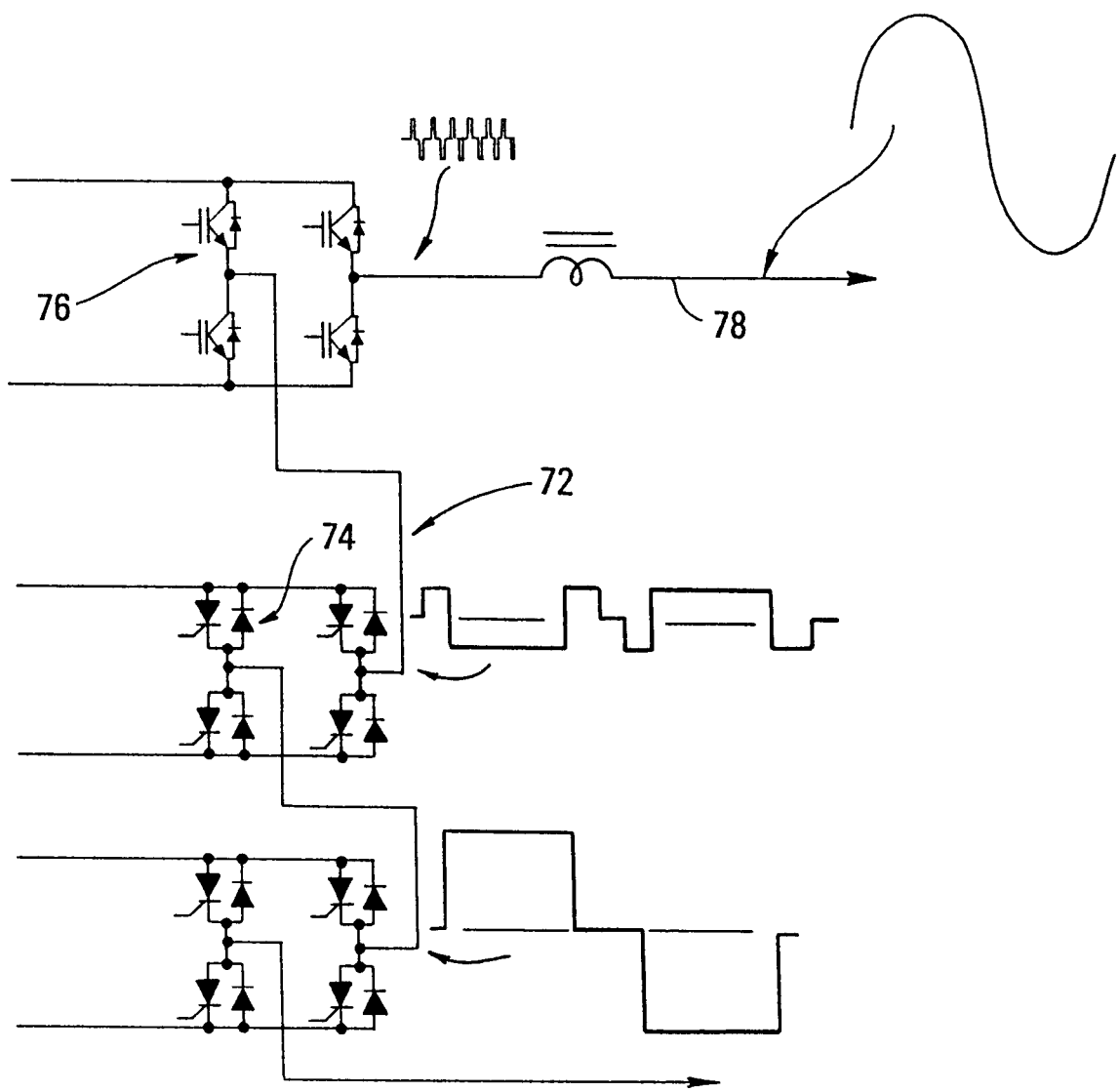
FIG. 7 is a more detailed partial schematic of the system of FIGS. 5 and 6.

FIG. 5 illustrates a block diagram, and FIGS. 6 and 7 illustrate simplified schematics for a system suitable for producing a 3-phase 4160 VAC line-to-line voltage. This voltage is commonly applied to high power AC motors rated 1,000 HP and higher. In this system, gate turn off devices (GTOs) are preferable for the low frequency switching to create the quasi-square waves and IGBTs 76 are preferably used in PWM with a control mode for harmonic elimination and to vernier control the high voltage AC output on line 78. Alternatively, IGBTs could be used in place of the GTOs, provided sufficient voltage rating is available.

The PWM control can be fast acting and can cause corrections within a few PWM cycle intervals, whereas the step waves can only control each half cycle of the target waveform. In general, there may be a 100:1 or greater difference between the two cycle times. The control applies to both the step wave and the PWM waveforms. The step wave "on time" is a function of the magnitude of the target waveform. For a lower value of target sine wave, the step is made more narrow. For a very low value of target voltage, the steps may not be required, and only the PWM waveform is used to control the output voltage. It should be noted that in spite of using steps, the magnitude of the output voltage may be considered to approximate a continuously variable quantity by making the increment or decrement of the AC output voltage arbitrarily small.

It is to be understood that the control system takes account of the target value of sine wave voltage and the program utilizes only those steps of the SWG blocks that are required, combined with the PWM voltage to achieve the target voltage. The sequence is to first determine the states required by the step waves and then with the knowledge of the value of the sum of the step voltage, the PWM voltage (as determined by control of or relative duration of the +E and −E outputs of the PWM) must be controlled to deliver the difference between the target sine wave and the sum of the step voltages. The process is to determine the entire PWM waveform by calculations that are typically 1 to 2 PWM time steps prior to action. The appropriate interval in which the step waves are turned on is controlled by the logic that regulates the magnitude of the PWM waveform. When the PWM action represents the highest value of voltage of which it is capable, then on the next step, the square wave is utilized and the PWM calculation takes account of having added a step. The result is that the next PWM waveform represents the minimum value of which it is capable. In the output waveform this appears as an average PWM voltage with a value that is close to its neighboring PWM voltage. It is to be understood that the total PWM width of time at maximum and time at minimum is fixed by the logic during the cycle prior to execution. The ratio is changed to obtain a target value of PWM voltage which is defined as the average value of voltage within the PWM time interval. The PWM interval is the time during which one cycle of PWM action takes place. If the PWM action is at 10 KHz, then the time interval is 100 milliseconds. A change in step wave is inserted whenever the ability to represent the target output voltage with the PWM action has reached an upper or lower limit. The PWM action must be capable of more range of voltage than just enough to match the incremental step wave voltage change. If not, the step wave change may be required to switch during a following cycle. To avoid this requirement, the PWM voltage range is extended slightly beyond the incremental value of the step wave change. For example, if the step wave change has a value of 1 unit, the PWM waveform must be able to generate output voltage to slightly more than ½ unit. If the PWM is carried, e.g., to 0.52 units, and the step wave is incremented, on the return during the next quadrant the sum of the PWM and step wave may be carried to 0.48 units before the step wave is switched to the ZERO state and the PWM thereafter operates with the step wave at 0 units.

Target voltage is to be understood to be the complete waveform that is desired in one complete cycle. Consider the waveform to be sliced into segments at time intervals equal to the PWM cycle time. The algorithm makes the segment voltage average value equal to the target voltage over one particular PWM cycle. Within each time segment, the voltage is at maximum positive value for a time interval and maximum negative for the balance of the PWM time interval. The sequence of all segment voltages is a stepped waveform which approximates the target voltage when filtered.

It is to be understood that each PWM cycle must provide an average voltage during the interval that is equal to the target voltage for that interval. For example, suppose that the target voltage is +300 volts and the source DC voltage is 400 volts. Then during the interval, the voltage must be equal to 400 volts for 75% of the time and equal to zero for the balance of the time. Note that in the bridge configuration, the available voltage is not just plus 400 or minus 400, but may also take the value of zero.

The segment voltage must be determined so that when added to the step waves, the target value of sine wave is attained during that interval. When this is done for each interval, the result is a relatively smooth sine wave. It is to be understood that the target voltage is the complete waveform that is desired in one complete cycle.

It is to be understood that a look up table can be used for control in the practice of the present invention. However one cannot then correct for non-linearity in the load, which may be generating undesirable harmonics. The lookup table can be used to provide numerical values for the target waveform. The digitized target harmonic voltages can be added, and the sum of these becomes the target voltage.

As has been mentioned, it may be found practical to utilize high voltage IGBTs in the step waveform stages, and low voltage IGBTs for PWM switching. High voltages IGBTs exhibit high power losses if the switching is at high frequency. Losses in the high voltage IGBTs are thus reduced to low levels, while low voltage IGBTs are used in PWM mode.

FIGS. 8, 9, 10 and 11 illustrate the operation of the system of FIG. 5 and circuits of FIGS. 6 and 7. In FIG. 8, the system of FIG. 5 and circuits of FIGS. 6 and 7 operate in a first mode and utilize two quasi square waves 80 and 82, each with a peak magnitude of 2 units along with a plot of the target waveform 84 with the PWM vernier waveform 86 having a peak magnitude of 1 unit.

It can be seen that in this mode, two step waves are used in series with the PWM waveform. While the circuit of FIG. 2 could develop a maximum voltage of only 3×maximum magnitude of the PWM wave, this circuit with the added step section can produce 5×the maximum magnitude of the PWM voltage. The system illustrated in FIG. 5 is suitable for a 4160 VAC line to line power system. The peak voltage required is 4160/1.732×1.5=3600 Volts from the DC power sources. Each of the two step waves must develop 40% of the voltage, and the PWM inverter must develop 20%. This requires that the PWM circuit operate from a DC source= 3600/5=720 VDC. If a $3^{rd}$ harmonic of 15% is added to the target AC waveform, the peak voltage is reduced to 1/1.15× 3600=3130 DC volts and 20% of this value =626 VDC. A 1200 VDC IGBT is suitable for PWM switching bridge circuit is able to operate in a pulse rate ranging from 10 KHz to 20 KHz without excessive power losses. The step wave generation must use IGBT's with a higher voltage rating.

Figure 9:
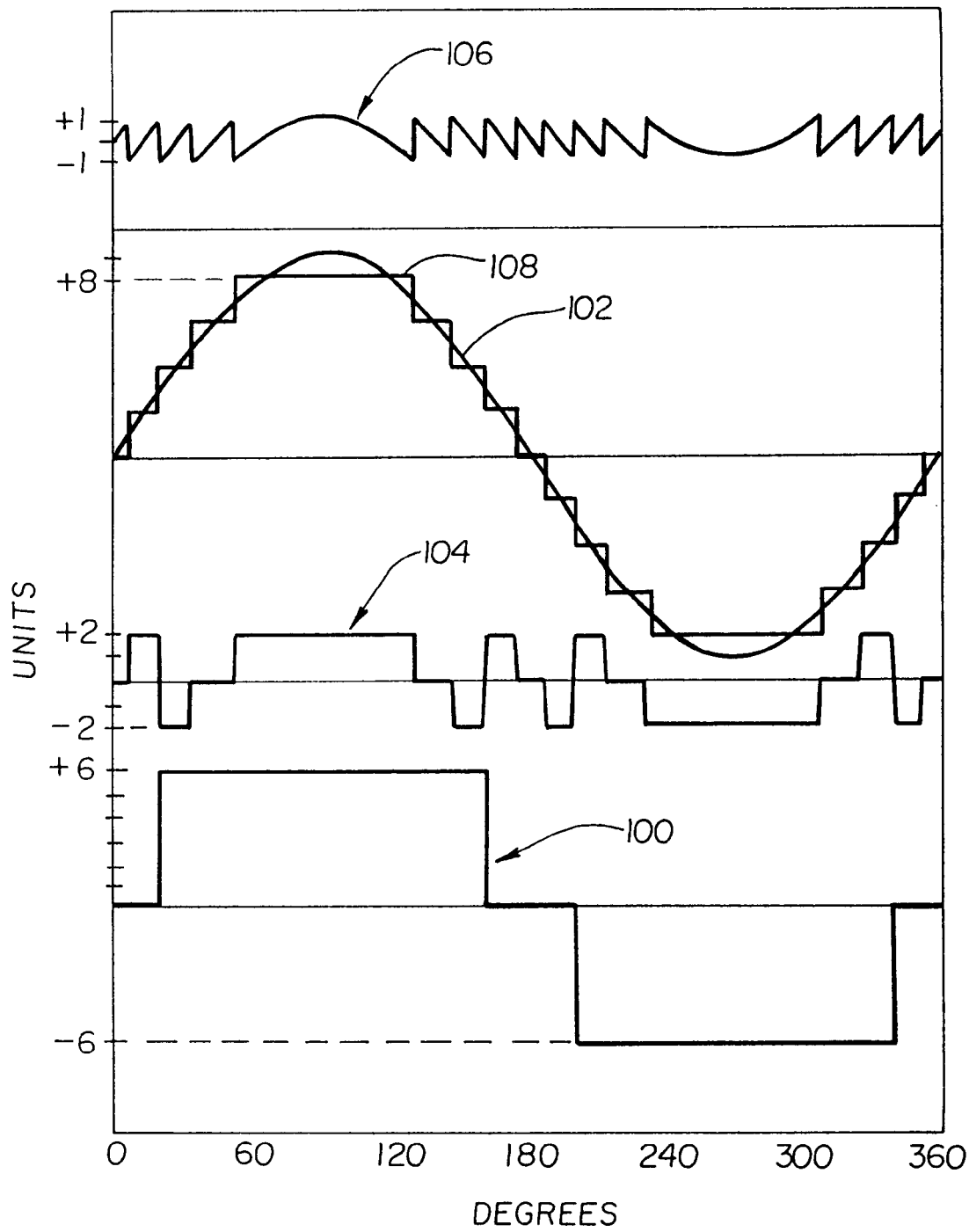
FIG. 9 is a set of waveforms illustrating the operation of the present invention according to the system of FIGS. 5, 6, and 7 while providing a relatively high output.
Figure 10:
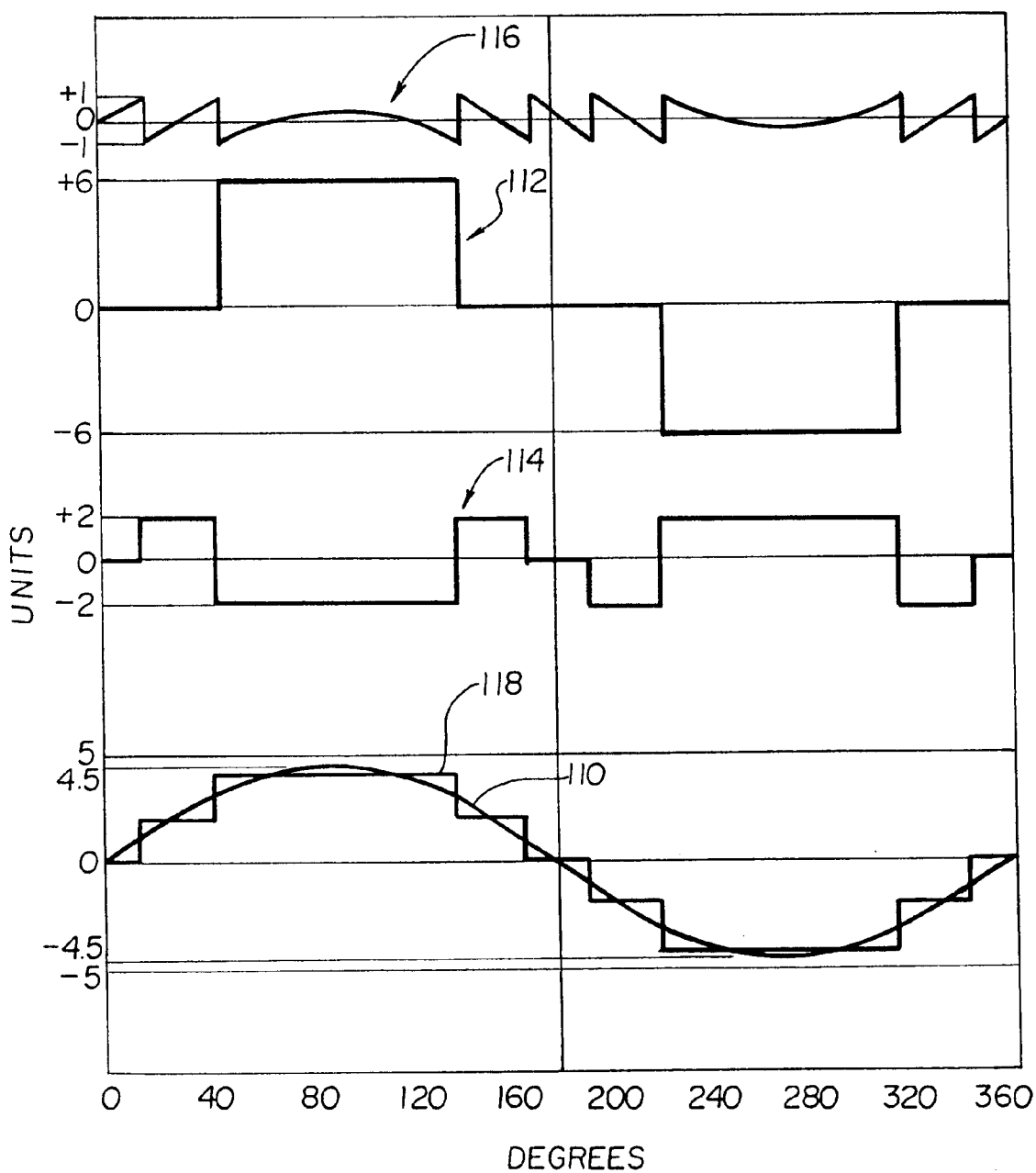
FIG. 10 is a set of waveforms similar to those of FIG. 9, except illustrating the operation of the present invention at an intermediate output.
Figure 11:
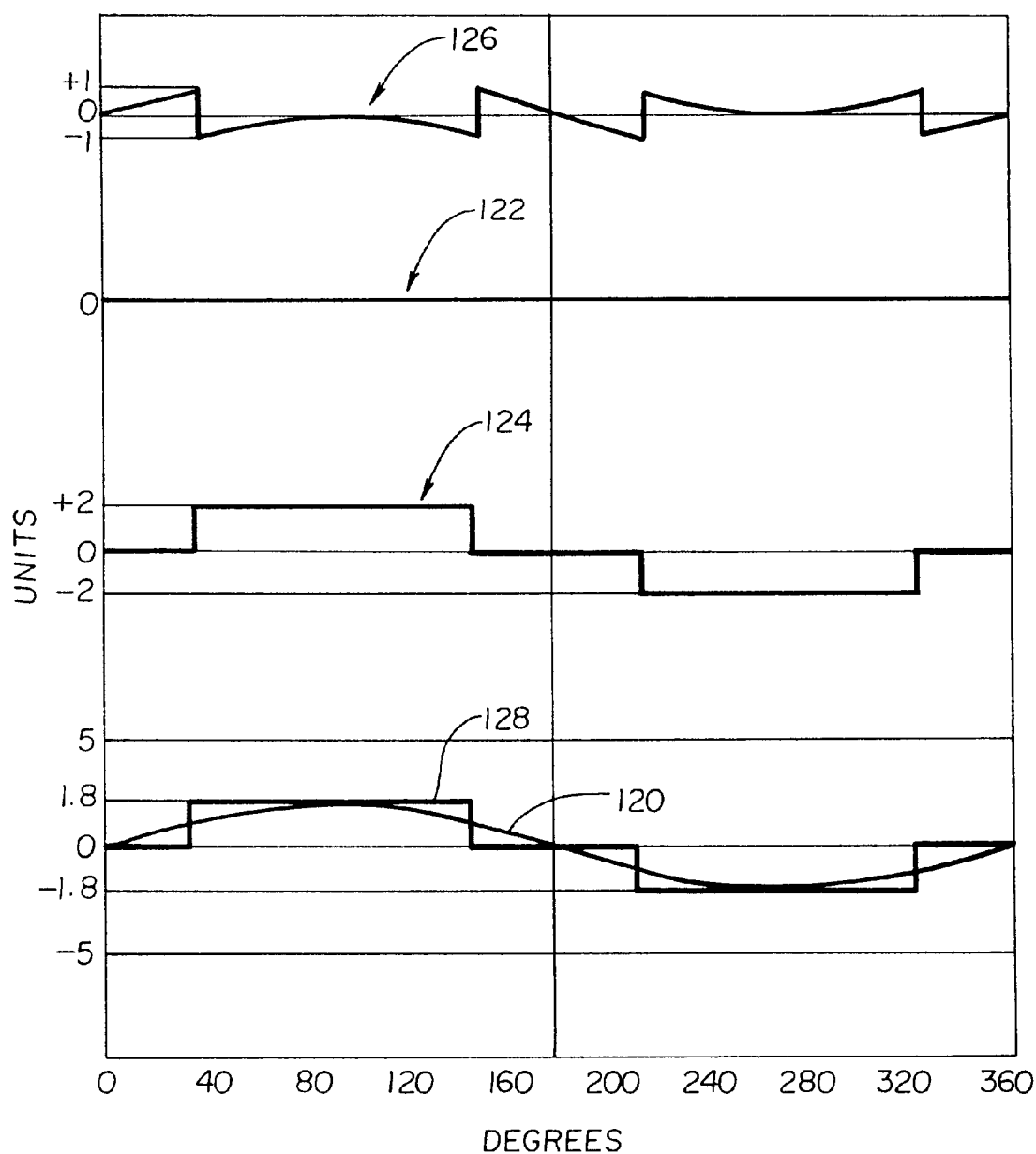
FIG. 11 is a set of waveforms similar to those of FIG. 9, except illustrating the operation of the present invention at a relatively low output.

FIGS. 9, 10 and 11 illustrate another mode of operation of the system and circuits of FIGS. 5, 6 and 7, with a different arrangement of relative magnitude and steps in the operation of the SWG's and with corresponding adjustments in the envelope of the PWM. In the practice of the present invention, the PWM waveform preferably has a magnitude of ±1 unit, the SWG1 has a magnitude of ±6 units, and the SWG2 has a magnitude of ±2 units. The repetition rate for SWG1 corresponds to the fundamental of the target sine wave form, and the maximum repetition rate needed for SWG2 is 5× the fundamental. In FIG. 9, the system is shown with a maximum amplitude output condition, with both SWGs providing quasi square waves, while the PWM provides "smoothing" between steps in the combined staircase waveform of the output of SWG1 and SWG2. At this operating condition, a first step wave 100 is at the base frequency of a target sine wave 102, and has a peak voltage magnitude of 6 units. A second step wave 104 has a magnitude of 2 units with an operating frequency of 5 times the base frequency. It is to be understood that the frequency of operation of SWG2 is a function of the magnitude of the target sine wave. When a PWM waveform 106 of magnitude 1 is added, the magnitude of the output waveform can be (theoretically, and ignoring forward voltage drops in the power semiconductor switches) as high as 9 units. However, in practice it has been found desirable to set the output sine wave to 0.9 of the maximum, or 8.1 units. A staircase waveform 108 is superimposed on the target waveform 102 to illustrate the result of the summation of the first and second step waveforms 100, 104 at maximum output conditions for this mode of operation.

FIG. 10 illustrates the same mode of operation of the system of FIG. 5, but at an intermediate output condition where the magnitude of the output at line 26 is 4.5 units. In this condition, a sine wave target waveform 110 is 0.5 of the maximum possible, or 4.5 units. The first step wave generator 14 has an output waveform 112 with an amplitude of 6. This is similar to waveform 100 shown in FIG. 9, with the same pulse repetition rate, but with a narrower pulse width. In this condition, the second step wave generator 72 has a quasi square waveform output 114 with a frequency of three times the base frequency and an amplitude of 2 units. The PWM output waveform 116 has an amplitude of ±1 unit, with a shape generally similar to waveform 106, but with transitions at the changes in the steps of a staircase waveform 118 which shows the summation of waves 112 and 114. Sine wave form 110 is the result (at line 26) of the summation of waves 112, 114 and 118, after filtering by filter 20.

A relatively low output magnitude condition is shown for system 70 in FIG. 11. In this condition, a sine wave target wave 120 has a magnitude of 0.2 of the maximum, or 1.8 units. In this condition, the output 122 of the first step wave generator 14 remains at zero, and the output 124 of the second step wave generator 72 operates at the base frequency, with an amplitude of 2 units. The PWM 12 has an output waveform 126 in this condition with an amplitude of 1 unit. A staircase waveform 128 is the same as the second step waveform 124.

With respect to the operation depicted in FIGS. 9, 10, and 11, it is to be understood that the PWM preferably remains at a fixed frequency (but varying duty cycle to give varying pulse widths corresponding to the waveform envelopes 106,116, and 126). It is to be understood that although three conditions are shown in FIGS. 9, 10, and 11, the output of system 70 is capable of providing a virtually continuous range of output conditions, from a relatively low level up to the maximum described with respect to FIG. 9. Furthermore, a primary advantage of the present invention is that the PWM waveform has a maximum value that is only ⅑ of the maximum AC peak voltage target. Consequently, low voltage, fast switching IGBTs can be used in the PWM subcircuits.

It is to be understood that the invention described herein is illustrative and not exhaustive of the various ways of carrying out the present invention. For example, the series connection of the subsystems 12, 14 and 72 may be rearranged, as desired, provided that all three subsystems remain in electrical series connection.

By way of further explanation of the present invention, the following may also be used using the same three stages of switching power semiconductors. For the following example, the voltages of operation are in the ratios of ±1 for the PWM, and ±2 and ±6 for the two SWG stages. The semiconductors in set A are the PWM which uses a DC supply voltage with a relative magnitude of 1 and operates to deliver a pulse width modulated output. Set B uses a DC supply voltage magnitude of 2 and operates in a quasi-square wave output mode, but at three times the fundamental frequency. Set C operates with a DC supply voltage of magnitude 6 and operates in SWG mode. The summation of sets B and set C provide voltage magnitude values (or more precisely ratios) of 0,±2,±4,±6 and ±8. To obtain a voltage of magnitude +4, set C has an output of +6 and set B has a magnitude of −2 and the sum is then +4. To obtain a voltage of magnitude +8 set C has an output of +6 and set B has an output of +2 so that the summation has the desired magnitude of +8. The total magnitude of the voltage by summation of sets A+B+C can be 9 (by the addition of 6+2+1), with a resolution of "2" in the stepped voltage. The PWM will provide a much finer resolution (typically, <<1), depending upon the operating frequency of the PWM and the filtering used.

If this method is used to obtain an AC output with a peak AC voltage magnitude of 3600 volts, then one unit of peak output voltage would have a magnitude of 3600/9=400 volts. Thus set A would operate at 6×400=2400 DC volts. Set B would operate at 2×400=800 volts DC. Set C would operate at 400 volts DC. In this, instance the semiconductors are preferably either thyristors such as silicon controlled rectifiers (SCRs) (with conventional commutation circuits) or GTOs because of the high operating voltages.

Using the techniques of the present invention, alternative circuits may be constructed to deliver higher AC voltages such as three phases 13.8 kV. In this instance, the summation of DC voltages must add to 11,300 volts. Using 3 units configured as C, one as B and one as A, the total number of voltage units would be 3×6+2+1=21 units. 11,300/21=538 volts per unit. Thus each configuration C stages would operate with a DC voltage of 6×538=3228 VDC. The B set would operate at 2×538=1076 VDC, and the A set would operate at 538 VDC.

Another example of the present invention is as follows. If a target load of 10 MVA at 3 phase 4160 VAC is desired, with the ability to vary the AC voltage from 0 to 4160 VAC and the frequency from 0 to 120 Hz, rated load current would then be 1390 amps AC[10 MVA/4160/sqrt(3)]. For a motor drive there is desirably 50% over current capacity in the power section, for a total of 2100 amps.

For a 3 phase 4160 VAC line to line system, the line to floating neutral voltage is 2400 VAC. The peak AC voltage in each phase is then 1.41×2400=3393 volts. Additional voltage is required to compensate for losses, resulting in a 3600 volt DC source required. The quasi square wave at base frequency must provide $2/3$ of the AC voltage or 2400 VAC peak, and so this SWG must have a 2400 VDC source. The quasi square wave at 5× base frequency must have a magnitude of $1/3$ of this value, or 800 VAC and must therefor have an 800 VDC source. The source for the PWM must produce a waveform having peak values of +400 VAC and must therefor have a source slightly greater than 400 VDC, because it is not practical to deliver a PWM output equal to the dc source value. A practical value would be 500 VDC for this application example. A disadvantage of this arrangement is that 3 different ratings of semiconductors are required. IGBTs having a rating of up to 3300 peak volts would be suitable for the first step wave generator, and IGBTs with a rating of 1400 peak volts would be suitable for the second step wave generator. The PWM IGBTs could be rated at 1000 peak volts, with capability of PWM rates above 10 KHz, with relatively low power losses.

The IGBT devices selected to switch the 800 VDC source will operate at the rate of 720 Hz. These devices are preferably selected to have a peak voltage rating of 1400 volts and a current rating of 1200 amps. For this application, three such devices are connected and operated in parallel for each switch position.

In the 5 step arrangement, the source voltage for PWM operation is $1/5 \times 3600=720$ VDC. The source voltage requirement for the first and second step waves is $2/5 \times 3600=1440$ volts peak. In this instance, two types of IGBT semiconductors are preferred. An IGBT with a rating of 2500 peak volts is desirable for the quasi square waves of the first and second square wave generators, and an IGBT with a 1400 peak volt rating is desirable for the PWM operation at frequencies up to approximately 5 KHz.

Some power semiconductor devices which are suitable for application in embodiments of the present invention include a Mitsubishi Electric Corporation Gate Turn-Off Thyristor, model FG4000BX-90DA for high voltage, low frequency duty. Suitable IGBT modules may be obtained from eupec, Inc. under model numbers FZ2400R17KF6C B2 (for a mid voltage PWM at, for example, 5 times base frequency) and FZ 2400R 12 KL4C (for low voltage PWM duty at, for example, 12 KHz). It is to be understood that other GTO and IGBT devices and modules (from the same or different manufacturers) may be appropriate, depending upon the parameters of the embodiment application.

It is to be noted that the rectifiers for the DC sources must be transparent to power flow. One practical rectifier system is to use a synchronous rectification using the same technology as that described for the SWG. Such a system will be able to provide DC power with no ripple and negligible harmonic feedback to the AC power mains. A synchronous rectifier system permits back flow of power and can present unity power factor to the source at all load conditions.

It is to be further understood that snubbers are required in all high voltage switching circuits. These generally take the form of a small value of capacitor and a series resistor. The snubbers add to losses, but are a requirement to protect the power semiconductors from excessive dV/dt stress.

The feedback voltage regulator control system must be responsive to the load requirements and is preferably not affected by source impedance or output impedance of the inverter. It is to be understood that the DC power supplies for the PWM and the step wave generators for magnitude 2 must be transparent to power flow because the power flow reverse under some operating conditions. The stages with magnitude 6 do not require reversible power flow because in every cycle the net power flow from the source is positive. Typical line voltage may vary as much as ±10% from rated values.

To prevent EMI interference in equipment associated with high power inverters and to prevent interference with the function of the control circuits on the inverters and the rectifiers, conventional EMI filters are preferable, along with conventional shielding.

According to one aspect of the present invention, additional stages may be added to increase the output magnitude as desired, using additional square wave generators having a relative magnitude of ±6 units. Because the additional stages are are each limited to 6 units, the system output can be increased as desired, using relatively low rated components in the individual added stages. According to this aspect of the invention, "n" additional square wave generators can be added in series with the 1 unit PWM and 2 and 6 unit SWG's, where "n" is a positive integer, taking on a value from the series: 1, 2, 3, . . .

This invention is not to be taken as limited to all of the details thereof as modifications and variations thereof may be made without departing from the spirit or scope of the invention.

What is claimed is:

1. Apparatus for producing a high voltage waveform corresponding to a target waveform using low voltage components comprising:
   a. a pulse width modulator for providing an output having a relative magnitude of one in the form of a succession of pulse train segments, each having an envelope conforming to successive corresponding segments of the target waveform;
   b. a first square wave generator connected to the pulse width modulator, and providing a bipolar square wave output having at least three output states;
   c. a second square wave generator connected to the first square wave generator, and providing a bipolar square wave output having at least three output states
   wherein the pulse width modulator and the first and second square wave generators are connected in series relationship, and further wherein the relative magnitude of one of the square wave generator outputs is six and the relative magnitude of the other square wave generator is two; and
   d. a control means connected to:
      i. the pulse width modulator for controlling the pulse width modulator to deliver the succession of pulse train segments separated by a plurality of transitions between segments, and
      ii. the first and second square wave generators for switching the respective bipolar square wave outputs from one state to another of the output states during each transition between successive segments,
   such that the output of the pulse width modulator is added to the outputs of the square wave generators to form a high voltage waveform output made up of the square wave outputs of the step wave generators and the segmented waveform output of the pulse width modulator.

2. The apparatus of claim 1 wherein the high voltage waveform are the target waveform are each sinusoidal.

3. The apparatus of claim 1 further comprising "n" additional square wave generators, where "n" is a positive integer and wherein each additional square wave generator has a relative magnitude of six.

4. The apparatus of claim 1 wherein the square wave generator having a relative magnitude of two has a relative maximum operating frequency ratio to the other square wave generator of five to one.

5. The apparatus of claim 1 wherein the pulse width modulator has an operating frequency range substantially greater than either of the square wave generators.

6. The apparatus of claim 1 wherein the pulse width modulator has an operating frequency of at least thirty times greater than either of the square wave generators.

7. The apparatus of claim 1 wherein the first square wave generator provides a plurality of isolated bipolar square wave outputs at a pulse repetition rate corresponding to a fundamental frequency of the output waveform.

8. The apparatus of claim 1 wherein the output states of each square wave generator are +ON, ZERO, and −ON.

9. The apparatus of claim 1 wherein the control means switches the pulse width modulator output from segment to segment, and simultaneously switches at least one of the square wave generators from one state to another.

10. The apparatus of claim 1 wherein each of the square wave generators comprises a full wave bridge having active switching elements and a DC power supply feeding the bridge.

11. The apparatus of claim 1 wherein the output of the pulse width modulator is bipolar.

12. The apparatus of claim 1 wherein the first square wave generator and the second square wave generator operate at different frequencies from each other.

13. The apparatus of claim 1 wherein the pulse width modulator operates at a frequency substantially greater than an operating frequency of either square wave generator.

14. The apparatus of claim 1 wherein the pulse width modulator further comprises a switchable bridge having a pair of input terminals and a pair of output terminals.

15. The apparatus of claim 1 wherein the output of one of the square wave generators is connected to the pulse width modulator.

16. The apparatus of claim 1 wherein the output of the pulse width modulator is connected to one of the square wave generators.

17. The apparatus of claim 1 wherein a source of direct current electrical energy powers the pulse width modulator.

18. The apparatus of claim 1 wherein each of the square wave generators is connected to a source of direct current electrical energy.

19. The apparatus of claim 1 further comprising a filter connected between the series connection of the pulse width modulator and the step wave generators and an output line for smoothing the combined output of the pulse width modulator and square wave generators.

20. A method of forming a high voltage time-varying waveform comprising the steps of:

a. connecting a pulse width modulator having a bipolar output with a relative magnitude of ±1 unit in series in series with a first step wave generator having a bipolar output with a relative magnitude of ±6 units and a second step wave generator having a bipolar output with a relative magnitude of ±2 units;

b. controlling each step wave generator to successive +ON, ZERO, and −ON states, while simultaneously controlling the pulse width modulator to provide a pulse train having an envelope corresponding to a plurality of successive segments of a desired time-varying waveform; and c. passing the combined output of the pulse width modulator and step wave generators through a low pass filter such that the resulting output is a time-varying waveform having a peak voltage equal to the sum of the outputs of the pulse width modulator and the step wave generators.

21. The method of claim 20 wherein the time-varying waveform is a sinusoid.

22. The method of claim 20 wherein step a further comprises connecting "n" additional square wave generators in series with the pulse width modulator and the first and second step wave generators, where "n" is a positive integer, and wherein each additional square wave generator has a relative magnitude of ±6 units.

23. The method of claim 20 wherein each of the pulse width modulator and step wave generators are powered from independent DC sources.

24. The method of claim 20 wherein the pulse width modulator is switched between successive segments when at least one of the step wave generators is switched between states.

25. The method of claim 20 wherein step b further comprises determining a target value of a sine wave voltage and controlling the step wave generator and the pulse width modulator to achieve the target value by first determining a difference between an output of the step wave generator and the target value and then controlling the pulse width generator to provide the difference between the target value and the output of the step wave generator.

26. The method of claim 20 wherein the pulse width modulator has an operating frequency range substantially higher than an operating frequency range of either of the step wave generators.

27. The method of claim 20 wherein step b further comprises providing successive transitions between states of each of the step wave generators, and controlling the pulse width modulator to provide a segment of a sine wave corresponding to the interval between successive transitions of at least one of the step wave generators.

28. The method of claim 27 wherein step b further comprises controlling each PWM cycle during the interval using pulse width modulation during the interval to provide an average voltage equal to the target voltage for that interval.

* * * * *